Oct. 20, 1959 M. MAUL 2,909,318
RECORD CARD CONTROLLED CROSS COMPUTING MACHINES
Filed Feb. 3, 1954 6 Sheets-Sheet 2

Inventor:
Michael Maul

Oct. 20, 1959 M. MAUL 2,909,318
RECORD CARD CONTROLLED CROSS COMPUTING MACHINES
Filed Feb. 3, 1954 6 Sheets-Sheet 4

Inventor:
Michael Maul

RECORD CARD CONTROLLED CROSS COMPUTING MACHINES

Michael Maul, Schwabach, near Nurnberg, Germany

Application February 3, 1954, Serial No. 407,977

Claims priority, application Germany February 10, 1953

20 Claims. (Cl. 235—61.1)

The present invention provides a record card controlled cross computing machine having particular advantageous and novel features over the machines known heretofore.

One important object of the invention is the provision of a particular kind of analysis for analyzing the items of a card to be cross computed, irrespective of the manner of manifesting the cross result, though the cross result is preferably manifested by punching the cross result into the item card. The kind of analysis can be equally well applied to single-deck and multi-deck cards, though later on the invention is described in connection with a multi-deck card.

Another very important object of the invention is to punch the cross result in any desired deck of a multi-deck card irrespective in what particular manner the cross result is obtained.

The following explanation will clarify the first mentioned object of the invention:

In record card controlled machines it is known to obtain the so called "cross result" by computing the data of different item fields of the same card. The cross result may either be printed on a list or may also be punched into the item card properly.

In the now generally used machines of the electrical type the cards are fed one by one past analyzing brushes. Accordingly, in this manner of operation all items are analyzed simultaneously and therefore the items cannot all be transferred at the same time to the cross result accumulator. Therefore, for obtaining the cross result the items analyzed during the card passage must be stored, for which purpose generally storing accumulators are used. After analysis of a card the data of these item stores are entered one after the other into the cross result accumulator. The machines having mechanical analyzing pins for the analysis of the punched cards operate in a similar manner also by means of item stores as the machines of the electrical type.

The machine according to the present invention avoids item storing by permitting the analyzing devices to operate immediately upon the cross result accumulator, but retaining the approved principle of feeding the card past the analyzers only once.

The advantages which the invention affords will become particularly obvious in electrical machines with successive analysis of the hole positions by a single row of analyzers, and are still more obvious when hole combinations are used. However, the invention may be equally well applied for the mechanical or any other kind of analysis of index marks. Moreover, the invention is not restricted to the application of combinations of index marks.

For the first object of the invention it is of no importance in which manner the cross result is manifested. Recording of the result can be effected in a known manner by printing upon a tabulating list or by back-punching the cross result into the item card as is the case in the embodiment described hereafter.

The present invention now proceeds from a cross computing machine for the item data in record cards wherein a predetermined value is associated with each index position according to which the cross result accumulator is controlled by the analyzers for the index marks being provided in the index positions; the data of a plurality of item fields are entered into the cross result accumulator.

The features of the machine according to the present invention may best be understood from a brief explanation which is based upon the analysis of cards having hole combinations which are punched according to the so called additive code. The values 1, 2, 3 and 3 are for instance associated with the four hole positions of a perforation column, by means of which values any one of the characters 1–9 may be represented by respective perforations in each column. When the card is fed in a known manner past a row of analyzing brushes this row of brushes analyzes first the position having the value 1 in all columns of all item fields. Now, with the analysis being maintained, the brushes of the various item fields are connected one after the other to the cross result accumulator and the latter is controlled in accordance with the perforations in the item fields. Subsequently the card is further advanced under the brushes until the row of brushes analyzes the positions having the value 2. In a similar manner as before, with the card remaining stationary the analyzers of the various item fields are again connected to the cross result accumulator one after the other, however, the partial value 2 being now transferred in all instances where there is a perforation. In a similar manner the advance of the card upon the positions of the next values is then continued and upon each position the analyzers of the item fields are connected one after the other to the cross result accumulator.

Accordingly, from the foregoing will be seen that according to the invention the card is fed by feeding means index position by index position past analyzers having a single analyzer for all index marks in a card column so as to analyze at one time a row of identical index positions in all card columns by said analyzers and that during the analysis of each row of index positions the cross result accumultor is consecutively connected to the various groups of analyzers associated to the various item fields to control the cross result accumulator by the index marks in the respective row of the various item fields.

Preferably the drive of the cross result accumulator is automatically settable to different driving strokes depending upon the value of the analyzed row of index positions, which drive remains each time set to the same driving stroke during the consecutive analysis of the item fields. This drive works out particularly favorable in the translatorless exploitation of hole combinations.

Selector means are preferably provided including a certain maximum number of connection fields for the analyzers of the item fields. After analysis of the item fields connected to the selector the latter returns automatically to initial position whereupon the advance of the card to the next row of index positions will automatically take place.

As for as the other very important object of the invention is concerned, it should be noted that in the known machines the data of successive item cards of a group are computed and the total, namely the group total of the items provided in these successive cards is punched in a special group total card.

The present invention, however, provides a cross computing machine in which the cross result can be punched in any desired deck of the item card proper by means of a punching mechanism being common to all decks. To this end the invention provides a multi-deck punched record card controlled machine for cross computing numbers represented by perforations in card fields of a card, each field comprising a plurality of card columns and each column serving for the representation of a digit by perforations in index positions of said card columns, said columns being arranged in a plurality of superpositioned decks, in combination, a cross result accumulator; feeding means for said cards; analyzing means for said card fields, means for automatically controlling said cross result accumulator consecutively by a plurality of card fields in said decks in accordance with the perforations; a punching mechanism common to all decks, said feeding means feeding the record decks to said common punching mechanism; means for automatically punching the card the fields of which have been analyzed under the control of said cross result accumulator in accordance with the setting of the latter; and means for selecting the card deck into which the cross result is punched upon feeding of said decks to said deck-common punching mechanism.

It will be seen that by the combination of means according to the invention a punched card controlled cross computing machine is obtained by which through a punching mechanism common to all decks the cross result may be punched in the desired deck of the controlling item card proper. Thereby a greater adaptability of the machine to the changing requirements determined by the kind of organization is obtained as regards the division of the card. This is due to the fact that upon the application of the invention a greater freedom is obtained with respect to the location as well as to the distribution of the cross items and of the cross result upon the various perforation decks of the card.

Upon application of the usual punched cards having a plurality of hole positions in each perforation column the punching mechanism which is common to all decks consists preferably of a row of punches having a single punch for each perforation column of the adjacent columns of a deck on which row of punches the hole positions of the columns are fed position by position upon the perforation of the result. With each punch preferably a punch selector magnet controlling a selector bar is associated, said bar supervising the punch so that only as many selector magnets need be provided as corresponds to the number of the columns in a single perforation deck.

For the deck selection it is of no importance in which manner the cross result is obtained. Known methods may be used in connection with the selective punching of the cross total in any desired deck. In the embodiment described hereafter, however, the cross result mechanism is directly controlled by the analyzing device in the same manner as has been explained with reference to the first object of the invention.

An embodiment of the invention is shown in the accompanying drawings. It will be understood that this embodiment serves both objects of the invention as outlined before but if desired also only one of the two objects may be obtained. The embodiment described hereinafter relates to a machine having electrical analysis and control by hole combinations, in which machine only positive cross items are computed in order to simplify the illustration of the invention.

Figures 1, 2:
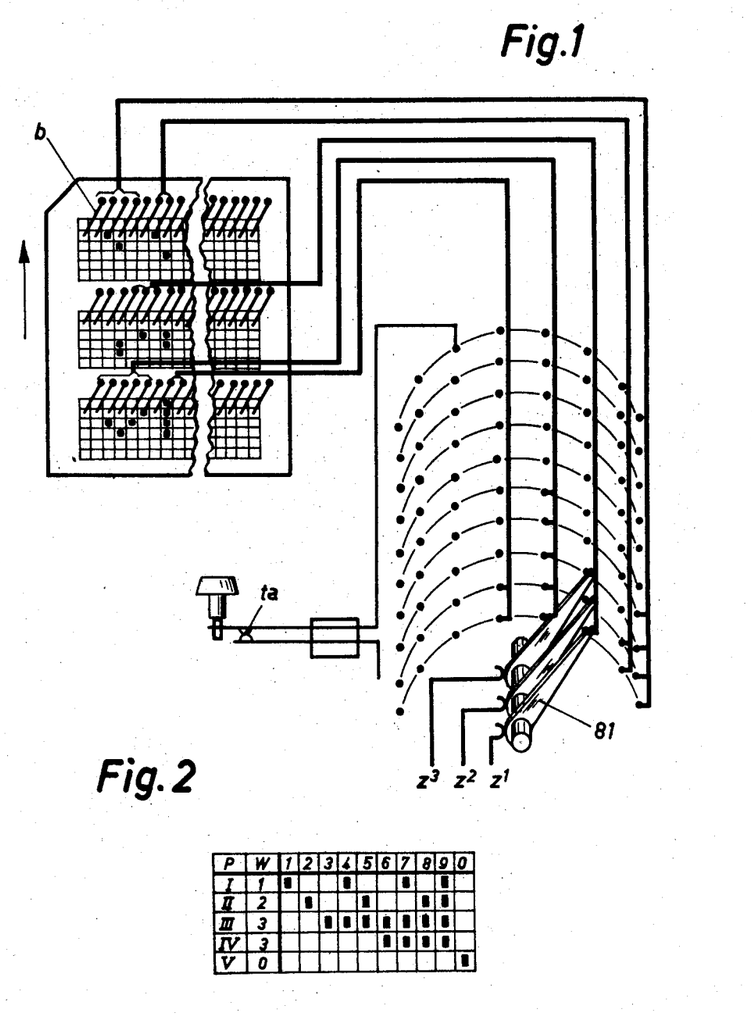
Fig. 1 shows diagrammatically the cooperation of the various analyzing brushes with the item selector device.
Fig. 2 shows the perforation code for the cards.

In the machine several items are obtained from one card and are entered into an accumulator. Subsequently, the total is derived from the accumulator and is punched into the same card. A card as used in the machine is represented in Fig. 1. The card has three decks each consisting of 30 columns, each column comprising six hole positions. The perforations in the card are effected in hole combinations according to the code in Fig. 2. In this code the value of a hole combination is composed of the various partial values which are associated with the various hole positions. These values are indicated in the column W whereas the column P indicates the position number (I to V). When, for instance, the first and third position are punched the value is composed of the value 1 (position I) and of the value 3 (position III) from which results the value 4. In a similar manner the value of each of the digits 0 to 9 follows from partial values being punched in the positions I to V. As is seen from Fig. 2 five hole positions are used for representing the numerals. The card division according to Fig. 1, however, shows six hole positions for the representation of letters, which, however, is of no importance for the present invention.

The drive for the accumulator has been constructed that according to the perforation in the card the various values are added up only in the accumulator to result in the proper total value of the character. In connection with this particular drive the combinational code enables a very simple transfer of a plurality of items to be added up which are to be derived from the same card.

The card is herein passed step by step under the analyzing brushes, all columns of the three decks being analyzed simultaneously, but the individual hole positions of each column one after the other. When analysing a certain position the drive for entering the values into the accumulator places is set to the corresponding value. At the beginning of an addition all first positions that are punched in the first item to be added up are analyzed at the same time and the partial value 1 is entered into the corresponding accumulator places. Subsequently the accumulator places are connected to another group of analyzing brushes which analyze the following item whereupon the transfer of the partial value of the first positions being punched in this following item is effected into the accumulator places. This cycle is continued up to the last item. When this cycle is finished and the first position of the last item has been entered into the accumulator the card is advanced to the next position and the drive for the accumulator is set to the corresponding value. Now, again adding up of the various punched positions of all items is effected, which means in this instance adding up of the positions having the value 2. Subsequently the III and IV positions of all items are still added so that the complete cross total of all items is provided in the accumulator.

Connecting of the brushes, which analyze the various items, to the respective accumulator places takes place by means of a particular selector device which will be described more in detail later on. In the machine described herein said selector device has been so constructed that up to eight cross items may be added up by aid of said device, but it is readily possible to construct the latter in a manner to include even a greater number of items. The selector device consists of selector arms 81 (Fig. 1) of which each is connected to an accumulator place $z$. With each selector arm there is associated a row of contacts over which the selector arm may slide. The row of contacts consists of lamellae to which the brushes analyzing the various items fields may be connected through a plug board. Connecting the brushes $b$ to the lamellae is herein so effected that the brushes analyzing an item field are plugged to various rows of contacts but to lamellae in the same position within each row, as is shown in Fig. 1.

After the set value has been entered into the accumulator from the last item the selector device returns immediatley to its initial position so that it is ready for the first item upon entering of the next value. Simultaneously herewith the card has been fed for one position and the drive has been advanced to the next value. If less than eight items are to be added up an earlier back run of the selector device is caused by presettable switches $ta$. A row of contacts has been additionally provided for the switches $ta$. To each of the lamellae of this row of contacts there is connected one contact $ta$. The first, second and last lamellae are excluded herefrom. The first two lamellae do not need a back run contact $ta$ since at least two items are required for one computation. For the last lamella an earlier back run is not necessary. The back run of the selector device is released as soon as the last selector arm 81 strikes a lamella, the contact $ta$ of the latter being closed, as will be described more in detail later on. Accordingly, if for instance five items have to be added up the contact $ta$ for the sixth lamella is closed and the back run is released as soon as the last selector arm strikes the sixth lamella.

When the last values of the last item have been entered the card is advanced to the punching device whereupon the cross total is derived from the accumulator and is punched into the card; the total may be punched in each predetermined deck.

Figures 5, 6:
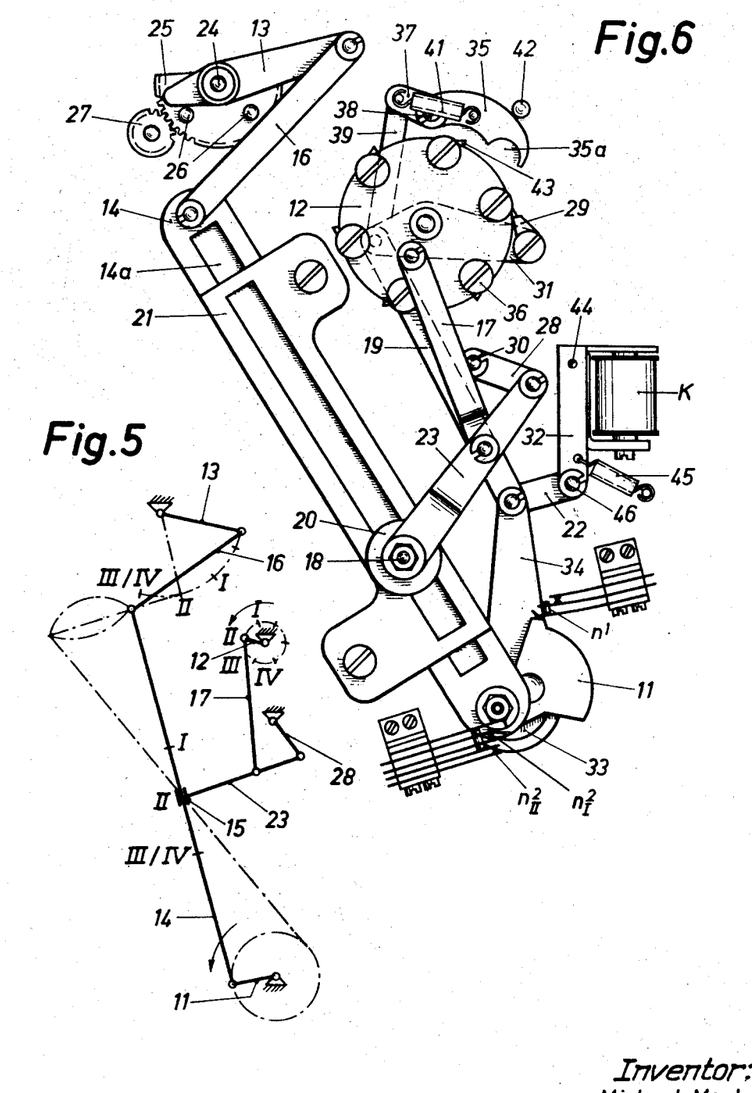
Fig. 5 shows the diagram of a crank drive as it is used for the translation of the hole combinations and for the entering of the values into the cross result mechanism which hereafter will always be designated by accumulator.
Fig. 6 shows the actual construction of the crank drive.

The setting of the accumulator which is effected value by value takes place by means of a crank drive the function diagram of which being shown in Fig. 5. The crank 11 is continuously driven with constant speed in counterclockwise direction. A rod 14 is pivoted to the crank 11, said rod being provided for reciprocating movement in a guide 15. The upper end of the rod 14 describes an ellipse-like curve. If the guide 15 is moved the curve will change. At the right hand end of the rod 14 there is the rocker 13 connected thereto by the link 16 which latter rocks in accordance with the curve. The angle through which the rocker 13 swings is herein dependent upon the shape of the curve. The guide 15 is now moved in such a way as to cause the various angles of swing of the rocker 13 to be proportioned to each other in the same manner as the values according to Fig. 2. The IV position is identical with the III position.

The position and dimensions of the crank drive have been chosen in such a manner that at the one dead centre of the rocker 13 the guide 15 as well as the auxiliary crank drive cooperating therewith, and being described later, may be adjusted without changing the position of the rocker 13. This is necessary since the clutch for the clutching of the registering places to their drive must be always in the same position independently of the position in which the guide 15 happens to be. It is only necessary to take care that the guide 15 has already reached the consecutive positions (indicated in Fig. 5 by Roman numerals in accordance with the hole position numbers) associated with the analyzing positions of the hole positions at the second dead center of the rocker 13 (indicated in dash lines in Fig. 5), since the position of this point determines the amount by which the accumulator place will be advanced.

The adjustment of the guide 15 is effected according to the values by a controlling crank drive from the crank 12. If the value or the analyzed position, respectively, changes the crank 12 is advanced from one unit and the guide is set correspondingly.

*Construction of the crank drive*

The actual construction of the crank drive is shown in Fig. 6. The rod 14 is linked to the crank 11 and has a rectangular cutout portion 14a in which can slide a guide piece. The guide piece is loosely rotatable upon the pivot pin 18. On the pin 18 there are further mounted two loose guide pieces adapted to slide in the guide bars which are provided on both sides of rod 14 and are fast to the base plate. As a protection against mutual interference of rod 14 and the guide bars 21 the disks 20 are provided. The arrangement of the guide pieces permits sliding of the pin 18 in the guide bars 21, sliding of the rod 14 on the pin 18 and rocking of the rod 14 relative to the fixed guide bars 21 about the axis 18. The displacement of the guide pieces is effected by the two links 23, which are screwed fast to the pin 18. At the left hand end of the rod 14 the rocker 13 is connected through the link 16. The rocker 13 is rotatably mounted on the stud 24 which is fast to the base plate and upon which also the toothed segment 25 can turn loosely. The rocker 13 can take the toothed segment 25 with it by engaging the two stops 26. The position of the stops has been chosen in such manner that upon change of direction the rocker 13 moves idly through a certain angle with respect to segment 25. This idle movement is necessary in order to render the drive stationary when the latter is clutched to the accumulator which takes place at the one dead center. The toothed segment 25 meshes with the pinion 27 from which the drive for the registering mechanism may be derived.

The positioning of links 23 and therewith of guide 15 is effected by crank 12 which in practice takes the form of a ratchet wheel. The rocker 28 connected to the links 23 is rotatably mounted at its right hand and on the stud 30 which is fast in the casing. The rocker 28 is necessary in order to safeguard the proper positioning of the link 23 and thereby also of the guide.

The drive for displacing the crank drive in accordance with the values is effected by the eccentric 33 which is fast to the crank 11 and rotates continuously with the latter. The eccentric operates upon the rod 34. The latter has, however, only influence upon the displacement of the controlling crank drive if the magnet K is energized. In this instance the armature is attracted whereby the stud 46 is held in an exactly predetermined position, the link 22 being mounted on the stud 46. According to the movement of the eccentric rod 34 the link 22 rocks also which transfers the movement to the rod 19; the latter is linked to the rocker 31. The pawl 29 is mounted on the rocker 31, said pawl advancing the ratchet wheel 21 and displacing therewith the guide 15. By this movement the movement of the guide 15 is effected through rod 17 which is pivotally mounted on the ratchet wheel 12 and through link 23.

If on the other hand the magnet K is deenergized no advance of the disk 12 or displacement of the controlling crank drive will take place. In this instance the armature 32 may rock about its pivot 44 so that the position of the stud 46 is not exactly determined. By support of the spring 45 the movement of the eccentric rod 34 is no longer directed to the rod 19 but to the link 22 and the armature 32.

The ratchet wheel 12 is arrested in the respective adjusting position. This protection is attained by the lever 35 with the semicircular recess 35a. The cutout portion 35a of the lever 35 can engage over the screw heads thus blocking the rotation of the crank disk 12 in both directions. This blocking must be maintained for some time. Moreover, a quick engagement is desired which is obtained by a snap-action mechanism. The arm 37 is rotatably mounted upon the stud 38 fast to the casing and is connected through link 39 to the rocker arm 31. Therefore the arm 37 will rock synchronously with the rocker arm 31. Upon the stud 38 there is also rotatably mounted the lever 35 which is connected by spring 41 to the arm 37. Under the influence of the rocking movement of the arm 37 the lever 35 will now continuously snap back and forth between the stop 42 and the screws 36. The dead center has been positioned in such manner that the lever 35 engages the screws 36 when the guide or the screws 36, respectively, have reached the proper position.

Clutch system for the accumulator places

Figure 7:
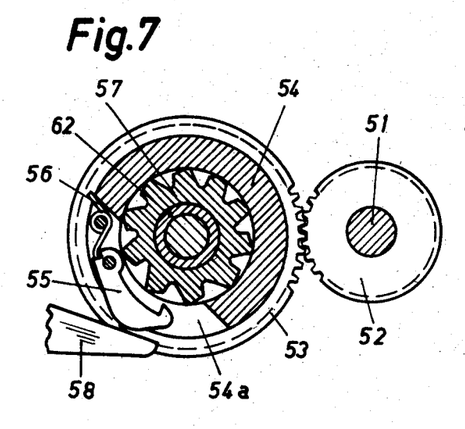
Fig. 7 shows the clutch system for an accumulator place transversely of the axis.

The back and forth movement of the pinion 27 (Fig. 6) is transferred through a gear mechanism to the shaft 51 having the gears 52 (Fig. 7) fast thereon. For each wheel of the accumulator a pinion 52 is provided. The latter meshes with the pinion 53 which is firmly pressed upon the ring 54 (Fig. 7). In the ring 54 there is provided a slot 54a accommodating the pawl 55 and the spring 56. By spring 56 the pawl 55 may always be held in one of two rest positions. The ring 54 rotates only upon the teeth of the actuating wheel 57 which is mounted on the sleeve 62.

According to the value of the effective hole position each ring 54, driven by its pinion 52, will be rotated. If the clutch magnet has been energised slightly earlier by a hole in the card, the lever 58 will encounter the pawl 55, which will be pressed into the gap between the teeth of the actuating wheel 57, said pawl taking the wheel 57 with it in clockwise direction. Engagement of the pawl can only occur in a predetermined position by means of the lever 58 and is controlled by the cam contact $n^1$ which is referred to later on in the circuit diagram. The position of the pawl is determined during clutching by the crank drive as has already been mentioned. The movement of the actuating wheel 57 always takes place for a multiple of the pitch so that its teeth will always be again in the proper position for engagement.

Figure 10:
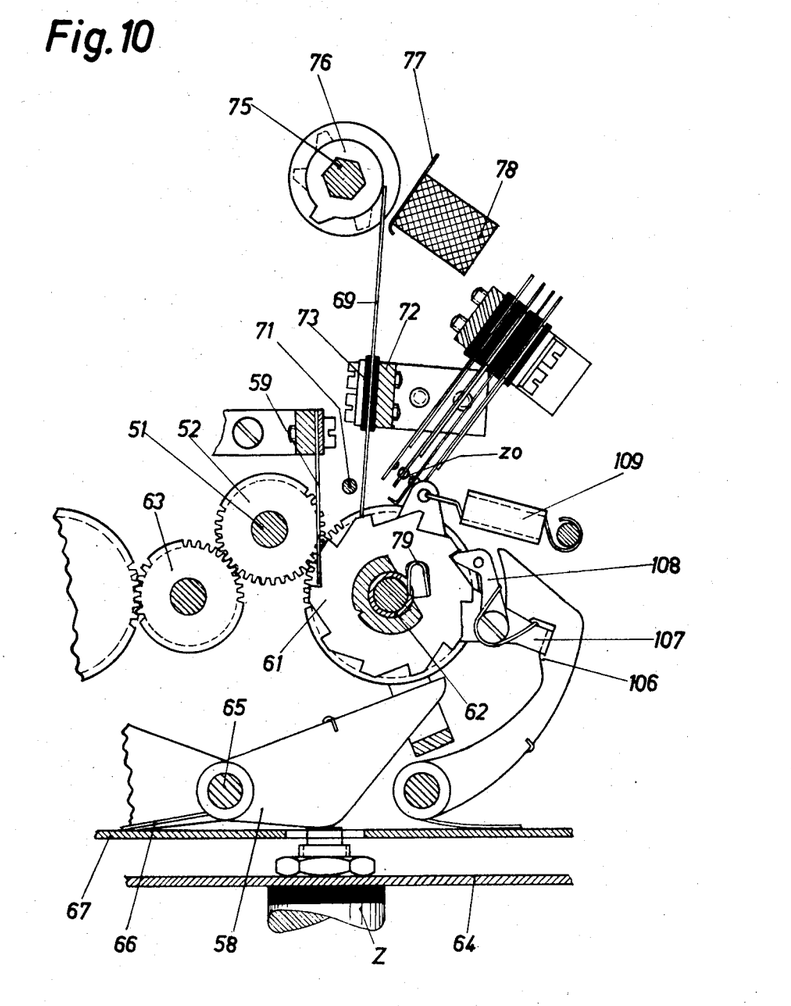
Fig. 10 shows the section through an accumulator place.

Upon backward movement of ring 54 the actuating wheel 57 is locked against backward movement by means of the spring 59 (Fig. 10). (The spring engages with a locking wheel 61 which is fast to the actuating wheel 57.) The pawl 55 is forced outward by the inclined back face of the tooth until it reaches its outer position in which it will then be held by the spring 56. Accordingly, declutching will automatically take place at the beginning of the backward movement. The ring 54 will now run back until the dead center for the next clutching operation is reached.

The actuation through the ring 54 from the drive 52 takes place in such a manner that the position of the actuating wheel 57 indicates the setting of the accumulator at the end of all transferring cycles.

Accumulator

Figure 4:
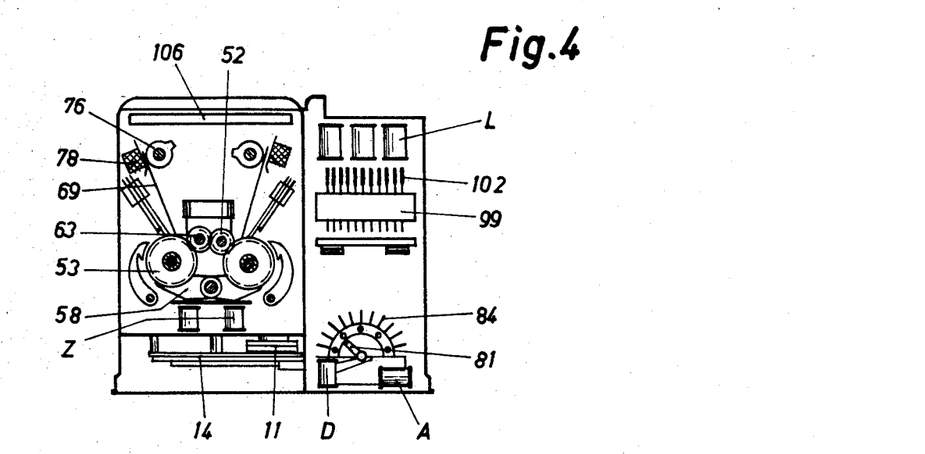
Fig. 4 shows diagrammatically a cross section through the machine.

The accumulator places are arranged in two rows at the rear side of the machine (Fig. 4). Their drive is effected by the gear 52 and the shaft 51 as has been already mentioned above. The drive to the clutch systems of the second accumulator row is transferred through idle gears 63 (Fig. 10).

Clutching of the accumulator places is effected by means of the levers 56 through the magnets Z, which are fast to the plate 64. The levers 58 are alternately arranged and mounted on the shaft 65. They are pressed against the plate 67 by means of the springs 66. If a magnet is energized it will press upon the lever 58 thereby clutching its accumulator element. The setting of the accumulator elements is now effected from the crank drive value by value in accordance with the subsequent analysis of the individual hole positions.

The analysis of the accumulators for the punching operation is effected again in partial value combinations in conformity with the card movement under the punching device, namely for all accumulator places simultaneously, however, for the individual positions one after the other.

Figure 8:
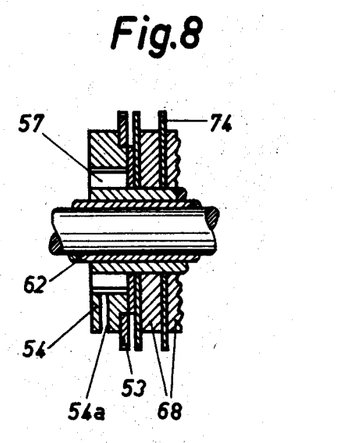
Fig. 8 shows the clutch system in section longitudinal of the axis.

For this purpose four cam disks 63 (Fig. 8) have been provided for each accumulator place, which disks are rigidly connected to the actuating wheel 57. On the 4 cam disks there are cams corresponding to the hole combination code in Fig. 2 which bear the contact springs 69 (Fig. 1) against the common conductor 71. For each cam disk 68 there is provided a contact spring 69. The latter are now urged in combinations against the common conductor 71 in accordance with the setting of the accumulator places, namely according to the code as shown in Fig. 2. If the accumulator is to be analyzed the shaft 75 is advanced step by step.

The shaft 75 is of hexagonal section upon which the cam disks 76 are mounted. For each spring 69 is provided a cam disk 76. The cams are offset relatively to each by one sixth. The springs 69 are pressed by the cams one by one against the contact bars 77. A separate contact bar is provided for each accumulator element, said bars being fastened to the insulating bar 78. The contact bar 77 is connected with the respective selector magnet for the punching device through a plug board, upon which selector magnet shall operate the accumulator element.

The current may only flow through the springs if the latter are also simultaneously pressed against the common conductor 71 by the accumulator arms. The position of the cams 76 has been so chosen that from the six operations or steps, respectively, the first to the fourth operation or step engages the cams. The fifth step is idle since in this position "0" is transferred.

Contrarily to the other positions the control of the zero punching operation is effected by the contact $zo$, which is actuated by a cam on the intermediate disks 74, said intermediate disks separating the cam disks 68 from one another. By means of the contact $zo$ suppression of the zero punching operation above the highest digit of a numeral may be controlled in a known manner.

The tens transfer takes place by means of the levers 106, 107, the pawl 108 and the spring 109 in a similar manner as is the case in the known Hollerith accumulators. For this reason the tens transfer shall not be described more in detail.

If the accumulator is to be reset, the sleeve 62 is rotated once in counterclockwise direction (Fig. 10). Depending upon the positioning of the accumulator places the springs 79 engage respective recesses of the sleeve 62 so that the latter takes with it the accumulator places upon the rotating movement until said accumulator places have reached the "zero" position.

Item selector device

Figure 9:
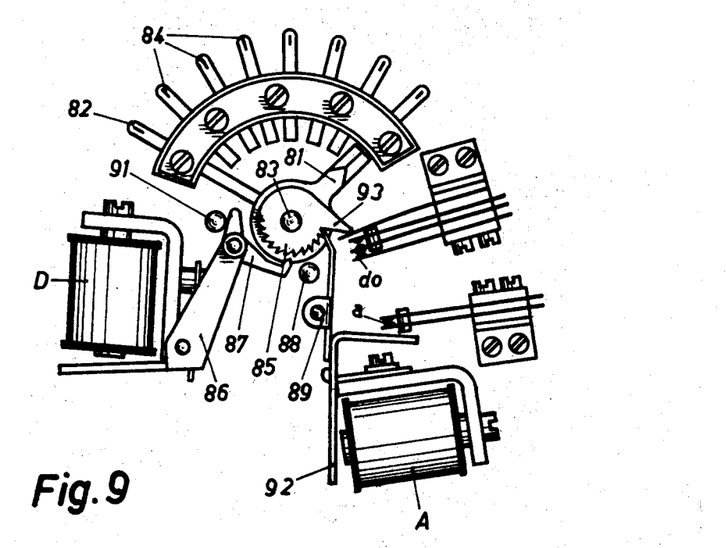
Fig. 9 shows the electro-mechanical construction of the selector device for connecting the items to the cross result mechanism.

As mentioned above the accumulator places are connected to various groups of brushes by means of a selector device which groups of brushes analyze the respective items to be added up. With each accumulator element is associated a selector arm 81 (Fig. 9) which receives current through the lamellae 82 which have permanent connection to the selector arm. All selector arms are comprised in a firm group which is mounted on the axis 83. Each selector arm slides over a row of contacts having the lamellae 84, to which the respective brushes may be connected through a plug board. A spring not represented has the tendency to rotate the selector arm group always in clockwise direction. This rotating movement is prevented by a detent pawl 89 which is urged resiliently against a disk 85 being partially toothed, which disk is firmly connected to the selector arm group.

If the magnet D is energized the same attracts its armature 86 whereby the pawl 87 being mounted on said armature drops into the gearing of the disk 85 and rotates the latter and therewith the selector arm in counterclockwise direction until the pawl 87 encounters the pin 88.

The detent pawl 89 clicks herein into the next gap. By this displacement the selector arms 81 reach the second lamella 84. When the current is interrupted by the magnet D the armature 86 drops and the pawl 87 returns again to its initial position. By the pin 91 the pawl is herein rocked out of the gearing of the disk 85. It is understood that upon energization of the magnet D always a displacement of the selector arm group for one step to the next lamellae takes place.

If the selector arms shall return to their home position the magnet A is energized which attracts its armature 92 and rocks the pawl 89 in clockwise direction out of the gearing of the disk 85. The selector arm group may now be rotated in clockwise direction by the spring not represented until the cam 93 of the disk 85 encounters the pawl 89 which consequently locks again the rotating movement. Simultaneously the cam 93 actuates the contact *do* the functions of which will be referred to later on in the description of the wiring. Upon energization of the magnet A the armature 92 of said magnet actuates the contact *a* the function of which will be also referred to in the description of the wiring.

Card movement

Figure 3:
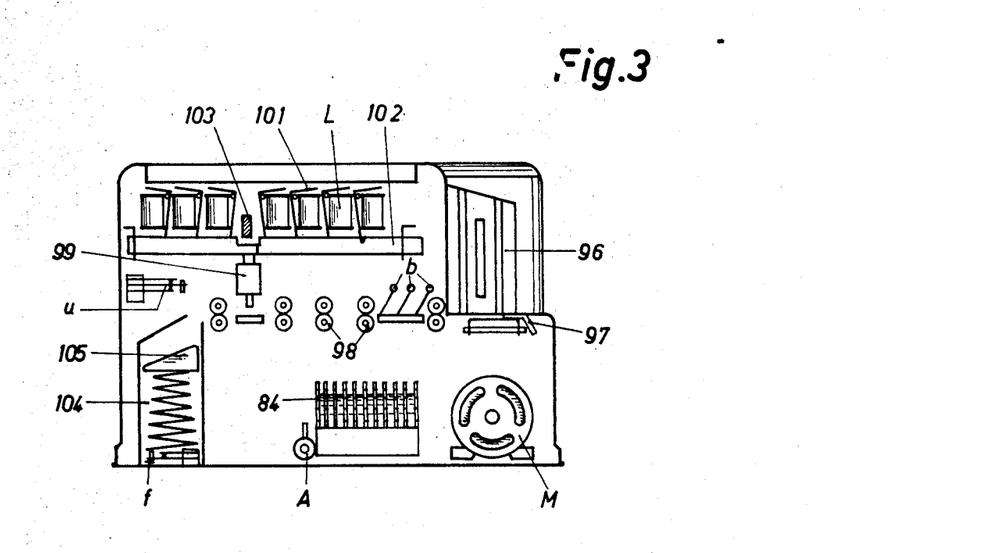
Fig. 3 shows diagrammatically a longitudinal section through the machine.

The cards are inserted into the magazine 96 (Fig. 3), are fed by the card knife 97 to the rollers 98 and from the latter to the analyzing brushes *b*. As soon as the first position of all three decks is under the brushes *b* entering of the punched values into the accumulator places is effected. By means of a clutch the card movement is herein interrupted so long until the first positions of all items have been transferred to the accumulator. Subsequently, the card feed is switched in temporarily so that the second position arrives under the analyzing brushes, whereupon again the transfer of all items is effected one after the other. When all positions have been analyzed and when all items have been transferred the cards are fed to the punching device 99 under which the three decks are passed and punched.

The selection of the punches takes place by means of the magnets L. If one of these magnets is energized it attracts its armature 101 which moves the selector bar 102 which is associated with said armature, in such manner that the full depth arrives under the punch yoke 103 which is continuously driven by the motor. The punch yokes takes the displaced selector bars with it downwardly which bars urge the associated punches through the card.

The punched cards are deposited in the receiver 104 on the card support 105. If the magazine is filled with cards and if the card support 105 has reached the lowest position it opens the contact *f* which renders the machine stationary. A plug board 106 known per se is arranged easily accessible above the accumulator (Fig. 4). On the plug board each brush may be connected with each lamella 84 of the selector device and the contact bar 77 of each accumulator element may be connected with each selector magnet L.

Wiring

Figure 11:
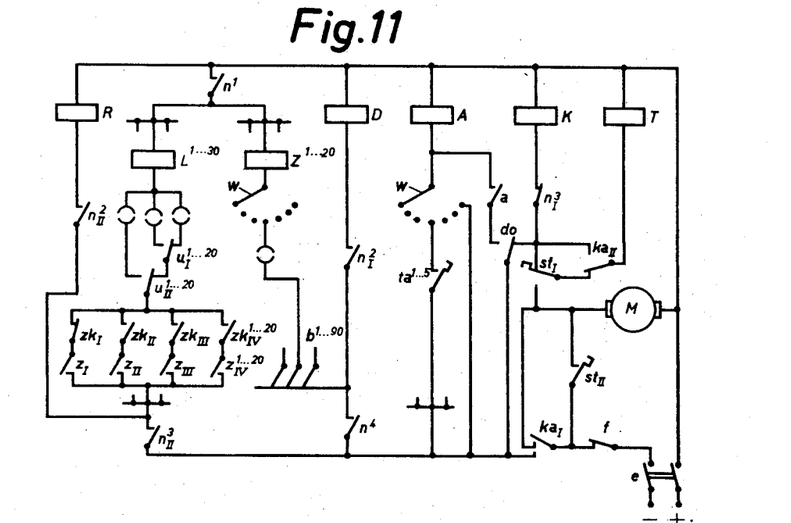
Fig. 11 shows the wiring diagram.
Figure 12:
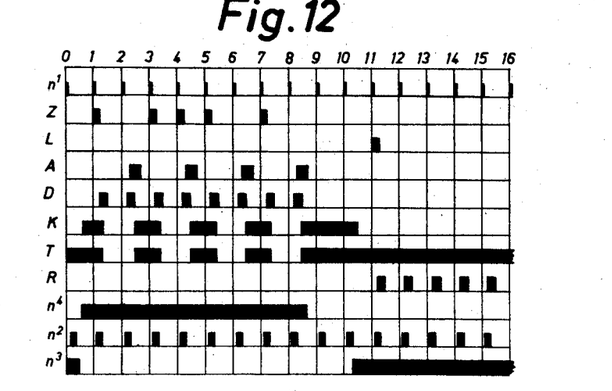
Fig. 12 shows the relay and cam-diagram.

In the illustration of the wiring a simplified method has been chosen as is generally used in the art of communication. In order to simplify reading of the circuit diagram (Fig. 11) in addition thereto is shown the relay- and cam-diagram (Fig. 12). It indicates the responding and actuating periods of the relay- and cam-contacts in dependency from the card movement. The unit of the operating cycle is one revolution of the crank 11 of the crank drive whereas in the way described above one value at a time is transferred into the accumulator. As an example in the cam diagram it has been assumed that at first two times at a time are analyzed from each card and that subsequently the total of the same is punched into the same card.

The machine is connected to the current source by means of the main switch *e*. But it is only when the start key is depressed and the contact $st_I$ is therewith shifted and the contact $st_{II}$ is closed that the machine starts running. The motor receives current from negative through the contacts *f* and $st_{II}$. Besides that the clutch magnet T receives current through the contacts *f*, $st_{II}$, $st_I$, $ka_{II}$ and clutches the card feed by means of a known and therefore not illustrated magnetic clutch to the motor. Now the first card is fed to the analyzing device.

Shortly before the first position has reached the analyzing brushes a known card lever is actuated by the card, which closes the contact $ka_I$ and shifts the contact $ka_{II}$. The start key may now be again released and the contacts *st* return again to their rest position, but the machine remains further operative by the contacts $ka_I$ and $ka_{II}$. Simultaneously with the actuation of the ka-contacts also the cam contact $n^4$ closes which is controlled by a cam rotating synchronously with the card movement. The cam contact $n^4$ closes as long as the decks are under the analyzing brushes *b*. The cam contacts $n^3_I$ and $n^3_{II}$ on the other hand are actuated by a cam rotating synchronously with the card movement as long as there are decks under the punching device. (The exact actuating periods of the cam contacts are to be seen from the diagram in Fig. 12.) When closing the card lever contact $ka_I$ the magnet K receives current through the card lever contact $ka_I$, the shift contact *do* and the cam contact $n^3_I$ so that the latter responds and initiates the displacement of the controlling crank drive from "0" to "1" as has been already mentioned above.

When now the first position has arrived under the analyzing brushes the cam contact $n^1$ closes temporarily so that now current may flow from the cam contact $n^4$ through brushes *b* having passed through a hole of the card, the plug board being illustrated by a circle in dash lines, the item selector device W, through the magnet Z of the accumulator and through the cam contact $n^1$ to positive. The corresponding magnets of the accumulator respond and clutch the associated accumulator places which are displaced for the value 1 in accordance with the setting of the crank drive.

The cam contact $n^1$ is controlled by a nose on the crank 11 (Fig. 6). Said contact closes consequently in each operating cycle. Besides that controlling of the two cam contacts $n^2_I$ and $n^2_{II}$ is also effected by the crank 11. The cam contacts are closed temporarily after the cam contact $n^1$ has opened again.

Shortly after the magnets Z have been energized the contact $n^2_I$ closes so that the magnet D may receive current and displaces the item selector device W for one step. Now the selector arm group leaves its initial position so that the contact *do* shifts. By shifting of the contact *do* the current circuit is interrupted to the clutch magnet T, which controls the card feed and to the magnet K which controls the displacement of the crank drive so that both magnets are deenergized. Accordingly, the first position of the card remains further on under the analyzing brushes and the crank drive remains set to the value 1. In the next operating cycle transferring of the first position of the second item to the magnets Z of the accumulator is effected. The selector arms 81 have set themselves to the second row of lamellae to which the corresponding brushes are plugged, which brushes analyze the second item.

After the transfer of the first position of the second item now the contact $n^2_I$ closes again temporarily so that now again the magnet D receives current and displaces the selector arm group for one step. If no third item is to be added up the key contact *ta* has been closed by pre-setting which key contact is plugged to the third lamella of a particular contact path of the selector device as has been already described above. When now the selector arm of this contact path engages the third lamella current may flow from the card lever contact $ka_I$ through the closed key contact $ta$, the particularly provided contact path of the selector device, through the magnet A to positive. The magnet A responds and outweighs the back run locking of the set of selector arms so that the latter may return to its initial position as has already been mentioned above.

By responding of the magnet A the latter closes its contact $a$ so that the magnet A establishes for itself a holding circuit through the shifted contact $do$, said holding circuit being only interrupted at the moment at which the selector arm group has reached its initial position and the contact $do$ returns to its initial position. By shifting of the contact $do$ now again the two magnets K and T receive current so that now the card and the controlling crank drive are displaced for one step.

Now the second position is placed under the analyzing brushes and the crank drive is set to the value 2. The same operating cycle is repeated for the second and the following positions, as has just been described.

When the last position of the last item has been entered into the accumulator the cam contact $n^4$ opens whereby the current for analysis as well as for the step by step shifting of the selector device is interrupted. The selector device consequently remains in its initial position and so the magnets K and T remain energized.

The card is now fed to the punching device. Shortly before the first position of the first deck has reached the punching device the cam contacts $n^3$ are actuated whereby the cam contact $n^3_I$ opens and the contact $n^3_{II}$ closes. The cam contact $n^3_I$ interrupts herein the current circuit to the magnet K so that the latter is deenergized and accordingly the displacement of the crank drive is interrupted. The latter is placed at this time one step before its setting to the value 1. The cam contact $n^3_{II}$ establishes the current circuit for the accumulator analysis and the punching device.

If the first position is under the punches the cam contact $n^1$ closes again temporarily. Current may flow from the cam contact $n^3_{II}$ through the contacts $z_I$ being closed in accordance with the accumulator setting, the contacts $zk_I$, $u_{II}$, $u_I$, through the plug board, through the punch selector magnets L, the cam contact $n^1$ to positive. According to the closed contacts $z_I$ the associated punch selector magnets L are energized which control punching of the cards. The analysis for the accumulator places has been designated by the contacts $z_I$ to $z_{IV}$, or $zk_I$ to $zk_{IV}$ respectively, in the wiring, which accumulator places for reasons of simplicity have been designated in Fig. 10 only by the numerals 71, 69 and 77.

After the first position has been punched the second position is fed under the punching device. Simultaneously therewith the cam contact $n^2_{II}$ closes temporarily which contact closes the circuit to the magnet R, so that the latter responds and displaces the analyzing shaft 75 of the accumulator (Fig. 10) for one step. Thereupon the contacts $zk_I$ are opened and the contacts $zk_{II}$ are closed. Now energization of the punch selector magnets L is effected in accordance with the closing of the contacts $z_{II}$. This operating cycle is repeated with the contacts $zk_{III}$ $z_{III}$ for the third and with the contacts $zk_{IV}$ and $z_{IV}$ for the fourth position.

If the second deck is fed under the analyzing device the contacts $u_I$ are shifted and therewith the current circuit is directed through another wiring device. A respective shifting also takes place when the third deck is under the punching device, namely by the shifting contacts $u_{II}$. Accordingly, in accordance with the plugging the total may be punched into each desired deck.

When the card receiver is filled with cards, the contact $f$ opens which interrupts the entire current circuit through the machine thereby rendering the latter stationary. The same is applied if there are no longer cards fed to the machine. In this instance the card lever contact $ka^1$ interrupts the current circuit.

I claim:

1. In a record card controlled machine for cross computing numbers represented by index marks in card fields of a card, each field comprising a plurality of card columns and each column serving for the representation of a digit by index marks in index positions of said card columns, in combination, a cross result accumulator, a single analyzer for all index marks in a card column, means for feeding the card with all card columns of said card fields concurrently index position by index position, past the analyzers for said card fields, and means for automatically connecting upon the analysis of the respective index position all analyzers of a field simultaneously but the analyzers of the various fields consecutively to said cross result accumulator to control the latter in accordance with the index marks in said analyzed index position.

2. In an electrically operating machine as specified in claim 1 wherein each analyzer consists of an analyzing brush and wherein said accumulator includes an accumulator magnet for each denomination, a commutator having a plurality of coaxially arranged rotatable contact arms each arm being electrically connected to one accumulator magnet, a common drive for rotating said contact arms, a plurality of contact pieces associated with each contact arm and circumferentially spaced on said commutator to be contacted one after the other by said contact arm upon the rotation of the same, the different contact pieces associated with the same contact arm being connected to the analyzers of the different card fields analyzing the columns of like denominational order and the contact pieces being contacted at one time by all contact arms being connected to the analyzers of one of the consecutively analyzed record fields.

3. In a record card controlled machine for cross computing numbers represented by index marks in card fields of a card, each field comprising a plurality of card columns and each column serving for the representation of a digit by index marks in index positions of said card columns, in combination, a cross result accumulator, a single analyzer for all index marks in a card column, means for feeding the card with all card columns of said card fields concurrently index position by index position, past the analyzers for said card fields, and means for automatically connecting upon the analysis of the respective index position all analyzers of a field simultaneously but the analyzers of the various fields consecutively to said cross result accumulator to control the latter in accordance with the index marks in said analyzed index position, and settable means responsive to the number of card fields to be analyzed and controlling said feeding means to feed automatically the next index position of said card fields to the analyzers after analysis of all card fields in one of said index positions.

4. In a record card controlled machine for cross computing numbers represented by index marks in card fields of a card, each field comprising a plurality of card columns and each column serving for the representation of a digit by combinational index marks in index positions of said cards columns, each index position having a predetermined value, in combination, a cross result accumulator, a single analyzer for all index positions in a card column, means for feeding the card with all card columns of said card fields concurrently in a step by step manner, index position by index position, past the analyzers for said card fields, means for automatically connecting in each step upon the analysis of the respective index position all analyzers of a field simultaneously but the analyzers of the various fields consecutively to said cross result accumulator, and means to control the latter by the index marks in accordance with the value of the analyzed index position.

5. A machine as specified in claim 4 having a driving mechanism for said accumulator, means for varying the driving stroke in accordance with the values of said index positions, means for maintaining the driving stroke in each step during the control of said accumulator by the consecutive analysis of said card fields, and means for automatically varying the driving stroke in accordance with the value of the subsequently analyzed index position upon feeding of the next index position to said analyzers.

6. In a punched record card controlled machine for cross computing numbers represented by perforations in card fields of a card, each field comprising a plurality of card columns and each column serving for the representation of a digit by perforations in index positions of said card columns, in combination, a cross result accumulator, a single analyzer for all index positions in a card column, means for feeding the card with all card columns of said card fields concurrently in a step by step manner, index position by index position, past the analyzers for said card fields, and means for automatically connecting in each step upon the analysis of the respective index position all analyzers of a field simultaneously but the analyzers of the various fields consecutively to said cross result accumulator to control the latter in accordance with the perforations in said analyzed index position, a punching mechanism past which the cards are fed by said feeding means after the analysis of the card fields, and means for automatically controlling said punching mechanism by said cross result accumulator and in accordance with the setting of the latter to punch the respective cross result in each card.

7. In a machine as specified in claim 6 wherein said punching mechanism includes a single row of punches arranged transversely of the feeding direction of the cards and in parallel with said analyzers and wherein the feeding means feed said cards in a step by step manner, index position by index position, past said row of punches.

8. In a multi-deck record card controlled machine for cross computing numbers represented by index marks in card fields of a card, each field comprising a plurality of card columns and each column serving for the representation of a digit by index marks in index positions of said card columns, said columns being arranged in a plurality of superpositioned decks, each deck comprising a plurality of columns, in combination, a cross result accumulator, a separate row of analyzers for each deck and including a single analyzer for each column, means for feeding simultaneously all decks with said columns extending in feeding direction index position by index position, past the rows of analyzers, and means for automatically connecting upon the analysis of the respective index position all analyzers of a field simultaneously but the analyzers of the various fields consecutively to said cross result accumulator to control the latter in accordance with the index marks in said analyzed index position.

9. In a multi-deck punched record card controlled machine for cross computing numbers represented by perforations in card fields of a card, each field comprising a plurality of card columns and each column serving for the representation of a digit by perforations in index positions of said card columns, said columns being arranged in a plurality of superpositioned decks, each deck comprising a plurality of columns, in combination, a cross result accumulator, feeding means for said cards, a separate set of analyzers for each deck, means for automatically connecting the analyzers of the various fields consecutively to said cross result accumulator to control the latter in accordance with the perforations, a punching mechanism common to all decks, said feeding means presenting the record decks one by one to said common punching mechanism, means for automatically punching the analyzed card under the control of said cross result accumulator in accordance with the setting of the latter, and means for selecting the card deck into which the cross result is punched upon the presentation of said decks to said punching mechanism.

10. In a multi-deck punched card controlled machine for cross computing numbers represented by perforations in card fields of a card, each field comprising a plurality of card columns and each column serving for the representation of a digit by perforations in index positions of said card columns, said columns being arranged in a plurality of superpositioned decks, each deck comprising a plurality of columns, in combination, a cross result accumulator, feeding means for said cards, means for automatically connecting the analyzers of the various fields consecutively to said cross result accumulator to control the latter in accordance with the perforations, a punching mechanism common to all decks, settable means responsive to the number of card fields to be analyzed and causing said feeding means to present the record decks one by one to said punching mechanism as soon as all fields have been analyzed, means for automatically punching the analyzed card under the control of said cross result accumulator in accordance with the setting of the latter, and means for selecting the card deck into which the cross result is punched upon the presentation of said decks to said punching mechanism.

11. In a multi-deck punched record card controlled machine for cross computing numbers represented by perforations in card fields of a card, each field comprising a plurality of card columns and each column serving for the representation of a digit by perforations in index positions of said card columns, said columns being arranged in a plurality of superpositioned decks, each deck comprising a plurality of columns, in combination, a cross result accumulator, a separate row of analyzers for each deck and including a single analyzer for each column, means for feeding simultaneously all decks with said columns extending in feeding direction in a step by step manner, index position by index position, past the associated rows of analyzers, means for automatically connecting in each step upon the analysis of the respective index position all analyzers of a field simultaneously but the analyzers of the various fields consecutively to said cross result accumulator to control the latter in accordance with the perforations in said analyzed index position, a punching mechanism past which the cards are fed by said feeding means in a step by step manner, index position by index position, said punching mechanism comprising a single row of punches arranged transversely of the feeding direction of a row of columns and being common to all decks, means for automatically punching the analyzed card under the control of said cross result accumulator in accordance with the setting of the latter, and means for selecting the card deck into which the cross result is punched upon the passage of said decks past the row of punches.

12. In a record card controlled machine for cross computing numbers represented by index marks in card fields of a card, each card field comprising a plurality of columns, each column being associated with a digit, each column having a plurality of code positions associated, respectively with code components of the digits so that index marks in each code position represent a digit component, and so that the index marks in each column represent a digit, in combination, a plurality of analyzer means for simultaneously analyzing in all card fields one of said code positions, each analyzer means being associated with one of said card fields; feeding means for feeding the card to said plurality of analyzer means code position-by-code position so that said plurality of analyzer means consecutively analyze each code position of said plurality of code positions; a cross result accumulator; and automatic means for automatically connecting upon the analysis of the respective code position all analyzer means of a field simultaneously, but the analyzer means of the various fields consecutively to said accumulator while said plurality of analyzer means are analyzing each of said code positions simultaneously in all card fields so that said accumulator forms sub-totals of digit components after each step of said feeding means and forms the total of said sub-totals when the card has been fed through all code positions.

13. In a record card controlled machine for cross computing numbers represented by index marks in card fields of a card, each card field comprising a plurality of columns, each column being associated with a digit, each column having a plurality of code positions associated, respectively, with code components of the digits so that index marks in each code position represent a digit component, and so that the index marks in each column represent a digit, in combination, a plurality of analyzer means for simultaneously analyzing in all card fields one of said code positions, each analyzer means being associated with one of said card fields; feeding means for feeding the card to said plurality of analyzer means step-by-step and code position-by-code position so that said plurality of analyzer means consecutively analyze each code position of said plurality of code positions; a cross result accumulator; automatic means for automatically connecting upon the analysis of the respective code position all analyzer means of a field simultaneously, but the analyzer means of the various fields consecutively to said accumulator while said plurality of analyzer means are analyzing each of said code positions simultaneously in all card fields; and means for controlling said feeding means to feed the card one step to the next following code position after all analyzer means of said plurality of analyzer means have been connected to said accumulator so that said accumulator forms sub-totals of digit components after each step of said feeding means and forms the total of said sub-totals when the card has been fed through all code positions.

14. In a record card controlled machine for cross computing numbers represented by index marks in card fields of a card, each card field comprising a plurality of columns, each column being associated with a digit, each column having a plurality of code positions associated, respectively, with code components of the digits so that index marks in each code position represent a digit component, and so that the index marks in each column represent a digit, in combination, a plurality of analyzer means for simultaneously analyzing in all card fields one of said code positions, each analyzer means being associated with one of said card fields; feeding means for feeding the card to said plurality of analyzer means step-by-step and code position-by-code position so that said plurality of analyzer means consecutively analyze each code position of said plurality of code positions; a cross result accumulator; automatic means for automatically connecting upon the analysis of the respective code position all analyzer means of a field simultaneously, but the analyzer means of the various fields consecutively to said accumulator while said plurality of analyzer means are analyzing each of said code positions simultaneously in all card fields; and means for controlling said feeding means to feed the card one step to the next following code position after all analyzer means of said plurality of analyzer means have been conected to said accumulator so that said accumulator forms sub-totals of digit components after each step of said feeding means and forms the total of said sub-totals when the card has been fed through all code positions, said last-mentioned means being manually operated for setting the same to a selected number of card fields.

15. In a record card controlled machine for cross computing numbers represented by index marks in card fields of a card, each card field comprising a plurality of columns, each column being associated with a digit, each column having a plurality of code positions associated, respectively, with code components of the digits so that index marks in each code position represent a digit component, and so that the index marks in each column represent a digit, in combination, a plurality of analyzer means for simultaneously analyzing in all card fields one of said code positions, each analyzer means being associated with one of said card fields; feeding means for feeding the card to said plurality of analyzer means step-by-step and code position-by-code position so that said plurality of analyzer means consecutively analyze each code position of said plurality of code positions; a cross result accumulator; and automatic means for automatically connecting upon the analysis of the respective code position all analyzer means of a field simultaneously, but the analyzer means of the various fields consecutively to said accumulator while said plurality of analyzer means are analyzing each of said code positions simultaneously in all card fields so that said accumulator forms sub-totals of digit components after each step of said feeding means and forms the total of said sub-totals when the card has been fed through all code positions, said accumulator comprising a driving mechanism including reciprocating control means, means for maintaining the driving stroke of said reciprocating control means during each operation of said automatic means, and means for automatically adjusting the driving stroke in accordance with the value of the digit component associated with any one code position upon feeding of the card to the respective code position.

16. In a record card controlled machine for cross computing numbers represented by index marks in card fields of a card, each card field comprising a plurality of columns, each column being associated with a digit, each column having a plurality of code positions associated, respectively, with code components of the digits so that index marks in each code position represent a digit component, and so that the index marks in each column represent a digit, in combination, a plurality of analyzer means for simultaneously analyzing in all card fields one of said code positions, each analyzer means being associated with one of said card fields; feeding means for feeding the card to said plurality of analyzer means step-by-step and code position-by-code position so that said plurality of analyzer means consecutively analyze each code position of said plurality of code positions; a cross result accumulator; automatic means for automatically connecting upon the analysis of the respective code position all analyzer means of a field simultaneously, but the analyzer means of the various fields consecutively to said accumulator while said plurality of analyzer means are analyzing each of said code positions simultaneously in all card fields so that said accumulator forms sub-totals of digit components after each step of said feeding means and forms the total of said sub-totals when the card has been fed through all code positions; and a punching mechanism arranged behind said analyzer means in the feeding direction of said feeding means, said punching mechanism being connected to and controlled by said accumulator to punch into the card index marks representing the total formed in said accumulator.

17. In a multi-deck punched record card controlled machine for cross computing numbers represented by perforations in card fields of a card, each field comprising a plurality of card columns and each column serving for the representation of a digit by perforations in index positions of said card columns, said columns being arranged in a plurality of superpositioned decks, each deck comprising a plurality of columns in combination, a cross result accumulator; feeding means for said cards; analyzing means for said card fields; means for automatically controlling said cross result accumulator consecutively by a plurality of card fields in said decks in accordance with the perforations; a punching mechanism common to all decks, said feeding means presenting the record decks one by one to said common punching mechanism; means for automatically punching the analyzed card under the control of said cross result accumulator in accordance with the setting of the latter; and means for selecting the card deck into which the cross result is punched upon the presentation of said decks to said punching mechanism.

18. An apparatus as set forth in claim 17 wherein said punching mechanism includes a single punch for each column for punching the index positions of the column one by one, the punch being common to all positions of the column and to aligned columns in several decks.

19. An apparatus as set forth in claim 18 wherein said punching mechanism includes a single selector magnet for each punch, each selector magnet controlling the associated punch in timed relation to the passage of the decks under said punches.

20. In a multi-deck punched record card controlled machine for cross computing numbers represented by perforations in card fields of a card, each field comprising a plurality of card columns and each column serving for the representation of a digit by perforations in index positions of said card columns, said columns being arranged in a plurality of superpositioned decks, each deck comprising a plurality of adjacent columns, in combination, a cross result accumulator; feeding means for said cards; analyzing means for said card fields; means for automatically controlling said cross result accumulator consecutively by a plurality of card fields in said decks in accordance with the perforations; a punching mechanism common to all decks, said feeding means feeding the card to said punching mechanism; means for automatically punching the analyzed card under the control of said cross result accumulator in accordance with the setting of the latter; and means for selecting a card deck into which the cross result is punched upon feeding of the card to said punching mechanism.

References Cited in the file of this patent

FOREIGN PATENTS 843,321     Germany _______________ July 7, 1952